US012767830B2

(12) United States Patent
Xu et al.

(10) Patent No.: US 12,767,830 B2
(45) Date of Patent: Oct. 20, 2026

(54) OIL-SOLUBLE BEETROOT RED PIGMENT AND PREPARATION METHOD AND APPLICATION THEREOF

(71) Applicant: HENAN ZHONGDA HENGYUAN BIOTECHNOLOGY STOCK CO., LTD., Luohe City (CN)

(72) Inventors: Xiaosong Xu, Luohe City (CN); Ziheng Jin, Luohe City (CN); Yanjun Wen, Luohe City (CN); Linzheng Li, Luohe City (CN); Honglong Li, Luohe City (CN); Di Wang, Luohe City (CN); Chunfeng Yu, Luohe City (CN)

(73) Assignee: HENAN ZHONGDA HENGYUAN BIOTECHNOLOGY STOCK CO., LTD., Luohe City (CN)

( * ) Notice: Subject to any disclaimer, the term of this patent is extended or adjusted under 35 U.S.C. 154(b) by 201 days.

(21) Appl. No.: 18/955,135

(22) Filed: Nov. 21, 2024

(65) Prior Publication Data

US 2025/0230319 A1 Jul. 17, 2025

(30) Foreign Application Priority Data

Jan. 11, 2024 (CN) ......................... 202410039933.5

(51) Int. Cl.
*C09B 61/00* (2006.01)
*C09B 67/04* (2006.01)
*C09B 67/20* (2006.01)

(52) U.S. Cl.
CPC .......... *C09B 61/00* (2013.01); *C09B 67/0002* (2013.01); *C09B 67/0069* (2013.01)

(58) Field of Classification Search
CPC . C09B 61/00; C09B 67/0002; C09B 67/0069; C09B 67/0083; A23L 5/43;
(Continued)

(56) References Cited

U.S. PATENT DOCUMENTS 4,132,793 A * 1/1979 Haber ....................... A23L 5/43
426/540

FOREIGN PATENT DOCUMENTS

CN 107874070 A * 4/2018 ............. A23L 29/03
CN 110699267 A * 1/2020 ............... C12N 1/16
(Continued)

*Primary Examiner* — Eisa B Elhilo

(57) ABSTRACT

The present invention belongs to the field of natural pigment modification and specifically relates to an oil-soluble beetroot red pigment, its preparation method and application. An aqueous solution containing beetroot red pigment and phospholipids is added to an aqueous solution containing water-soluble proteins and/or water-soluble peptides, and the mixture is dried to obtain an oil-soluble beetroot red pigment composite powder. The powder is subjected to low-temperature ultra-fine grinding to produce ultra-fine oil-soluble beetroot red pigment powder. Finally, the ultra-fine powder is added to vegetable oil and processed through a ball mill-colloid mill cycle to obtain the oil-soluble beetroot red pigment. The oil-soluble beetroot red pigment requires no chemical modification and contains no synthetic emulsifiers or additives. The materials used are natural and safe, improving the light stability and thermal stability of beetroot red pigment, expanding its application scope, and providing a viable alternative to industrially synthesized oil-soluble pigments.

8 Claims, 5 Drawing Sheets

(58) Field of Classification Search
CPC ...... A23L 29/035; A23L 29/045; A23L 29/05; A23V 2002/00
USPC .............................................................. 8/438
See application file for complete search history.

(56) References Cited

FOREIGN PATENT DOCUMENTS

| | | | | | |
|---|---|---|---|---|---|
| CN | 113041176 | A | * | 6/2021 | ......... C09B 67/0096 |
| CN | 115160389 | A | * | 10/2022 | ............. A61K 8/602 |
| CN | 116731532 | A | * | 9/2023 | ............. C09B 61/00 |
| KR | 20040078679 | A | * | 9/2004 | ........... A23L 13/428 |

* cited by examiner

OIL-SOLUBLE BEETROOT RED PIGMENT AND PREPARATION METHOD AND APPLICATION THEREOF

This application claims priority to Chinese Patent Application No. 202410039933.5, filed on Jan. 11, 2024, which is incorporated by reference for all purposes as if fully set forth herein.

TECHNICAL FIELD

The invention relates to the field of natural pigment modification, and an oil-soluble beetroot red pigment and a preparation method and application thereof.

BACKGROUND TECHNIQUE

Beetroot red pigment is a natural pigment made from edible red beets through extraction, separation, concentration and drying. Its main components are betacyanins and betaxanthin. The beetroot red pigment is a reddish-purple to deep purple liquid, block, powder, or paste, with a distinctive odor. It is freely soluble in water, poorly soluble in anhydrous ethanol, propylene glycol and acetic acid, and insoluble in organic solvents such as ether, acetone, chloroform, benzene, glycerin and oils. Its aqueous solution is red to purple-red, with bright color and good dyeing properties, but poor heat resistance, and the degradation rate increases with rising temperature.

As early as 1960, the United States authorized the use of red beet juice concentrate or dehydrated red beet powder as a food colorant and listing it under the "Exempt from Certification" category. In 1978, the Joint FAO/WHO Expert Committee on Food Additives reaffirmed that a provisional acceptable daily intake (ADI) for these substances was "not required." Betanin, an inert pharmacological compound, is deemed as safe as consuming edible beets. The hygienic standards for food additives specify that beetroot red can be used in fruit-flavored beverages (liquid, solid), juice drinks, soda, mixed wine, candy, pastry for decoration, candied peel, canned food, concentrated juice, green plum, ice cream, popsicles, sweet jelly, wafers and sandwich layers, among other products. Its use amount should conform to standard production requirements.

Since beetroot red pigment is easily soluble in water but insoluble in oil, its application range is significantly restricted. Based on this, extensive research has been conducted to improve the oil solubility of beetroot red pigment, including: Chinese patent CN201911001462.4 discloses a strain of *Candida vesica* and its use in the preparation of oil-soluble beetroot pigment. This process involves combining a biosurfactant, produced through the fermentation of *Candida vesica*, with oil and beetroot pigment. The resulting beetroot red pigment disperses evenly without precipitation. However, the high cost of the strain makes large-scale production challenging, and the biosurfactant lacks standardized regulations. Chinese patent CN201711092553.4 describes a beetroot red pigment emulsification process, in which beetroot red pigment powder is mixed with an oil phase dispersion, ground. Then an emulsifier is added and vacuum emulsified to obtain oil-soluble beetroot red pigment. Although the emulsifier facilitates the emulsification and dispersion of beetroot red pigment particles, the pigment itself is not lipophilic. Maintaining a stable solid-liquid interface with the emulsifier is challenging, leading to layering and deposition, which compromise the product's quality and usability. Chinese patent CN202210880227.4 discloses a method for preparing modified, which reacts beetroot red pigment with a carboxylic acid compound to obtain modified beetroot red pigment, solving the problem of beetroot red pigment being hydrophilic and oleophobic, making it applicable to oil-soluble systems. However, this method requires a substantial amount of toxic solvents, which limits its applicability in the food industry.

While addressing the hydrophilic and oleophobic challenges of beetroot red pigment to a certain extent, current methods still have significant limitations. Most the processes are complicated to operate and costly, some require toxic solvents, raising concerns about food safety. Additionally, the final product has low stability in use, making it unable to meet market demand. Therefore, it is necessary to provide a new type of oil-soluble beetroot red pigment to overcome the above defects and shortcomings.

SUMMARY OF THE INVENTION

To overcome the deficiencies and shortcomings of the prior art, the primary purpose of the present invention is to provide a method for preparing an oil-soluble beetroot red pigment, without the use of organic solvents, chemical modification of beetroot red pigment, or the addition of synthetic emulsifiers. The materials used are natural and safe, enabling the beetroot red pigment to disperse uniformly and stably in oils and fats. This innovation expands the application of beetroot red pigment from water-soluble to oil-soluble systems, while also enhancing its stability.

A further objective of the present invention is to provide the oil-soluble beetroot red pigment produced by the aforementioned method.

Additionally, the present invention aims to introduce the applications of this oil-soluble beetroot red pigment.

The purpose of the present invention is achieved through the following technical solutions:

(1) Add an aqueous solution containing beetroot red pigment and phospholipids to an aqueous solution containing water-soluble proteins and/or water-soluble polypeptides to obtain a beetroot red pigment-phospholipid-protein/polypeptide mixed solution; (2) Drying the beetroot red pigment-phospholipid-protein/polypeptide mixed solution obtained in step (1) to obtain an oil-soluble beetroot red pigment composite powder;

The method for preparing the oil-soluble beetroot red pigment preferably also includes the following steps:

(3) Low-temperature ultrafine grinding of the oil-soluble beetroot red pigment composite powder obtained in step (2) to obtain an oil-soluble beetroot red pigment ultrafine powder;

The method for preparing the oil-soluble beetroot red pigment preferably also includes the following steps:

(4) Adding the oil-soluble beetroot red pigment ultrafine powder obtained in step (3) to vegetable oil, grinding and dispersing, to obtain an oil-soluble beetroot red pigment;

In step (1), the mass ratio of beetroot red pigment to phospholipid is 1:(0.05-30.0), preferably 1:(0.05-20.0);

In step (1), the mass fraction of the aqueous solution containing water-soluble protein and/or water-soluble polypeptide is 5-45%, preferably 5-25%;

In step (1), in the beetroot red-phospholipid-protein/polypeptide mixture, the mass ratio of the total amount of water-soluble protein and water-soluble polypeptide to beetroot red is (0.01~13.0):1, preferably (0.01~10.0):1;

In step (1), the phospholipid is at least one of lecithin, modified soybean phospholipid and enzymatically hydrolyzed soybean phospholipid;

In step (1), the phospholipid is preferably at least one of modified soybean phospholipid and enzymatically hydrolyzed soybean phospholipid;

In step (1), the aqueous solution containing beetroot red pigment and phospholipid is preferably prepared by the following method: The beetroot red pigment and phospholipid are mixed and dissolved in water to obtain a uniform solution, which is an aqueous solution containing beetroot red pigment and phospholipid;

In step (1), the water-soluble protein is at least one of collagen, soy protein isolate and sodium caseinate;

In step (1), the polypeptide is soy oligopeptide;

In step (1), the aqueous solution containing water-soluble protein and/or water-soluble polypeptide preferably contains at least one of soy protein isolate, sodium caseinate and soy oligopeptide;

In step (1), the aqueous solution containing beetroot red pigment and phospholipids is preferably slowly added to the aqueous solution containing water-soluble protein and/or water-soluble polypeptide and sheared to mix well to obtain a beetroot red pigment-phospholipid-protein/polypeptide mixed solution;

In Step (2), the preferred drying method is spray drying. The particle size of the oil-soluble beetroot red composite powder obtained by spray drying is relatively small (up to below 100 mesh), which enhances the efficiency of subsequent ultrafine grinding;

In Step (2), the preferred spray drying methods include at least one of pressure spray drying and centrifugal spray drying;

In Step (2), the beetroot red pigment-phospholipid-protein/peptide mixture is preferably homogenized before drying;

In Step (3), the preferred low temperature is 0-10° C.;

In Step (3), the particle size of the oil-soluble beetroot red ultrafine powder is 100-300 mesh, preferably 200-300 mesh;

In Step (4), the mass fraction of the beetroot red ultrafine powder in the vegetable oil is 10-50%, preferably 10-30%;

In Step (4), the vegetable oil is at least one of olive oil, corn oil, sunflower seed oil, safflower seed oil, and soybean oil;

In Step (4), the preferred vegetable oil is one or more of olive oil, corn oil, or sunflower seed oil;

In Step (4), grinding and dispersion are preferably done by cycle processing with a ball mill-colloid mill;

In step (4), the grinding and dispersion is preferably processed until the D90 of the beetroot red pigment is less than 0.5 μm;

In step (4), the grinding and dispersion time is preferably not less than 240 min;

Principle of the Present Invention

First, in an aqueous solution environment, the hydrophilic-OH group of the phospholipid molecule and the carbonyl (=O) group of the beetroot red pigment molecule can be combined by hydrogen bonding, and the bonding ratio is 1:1, where one phospholipid molecule binds to one beetroot red pigment molecule. Therefore, the present invention provides lipophilicity to beetroot red pigment through phospholipids. Furthermore, the aqueous solution containing beetroot red pigment and phospholipids is slowly added to the aqueous solution containing water-soluble proteins and/or polypeptides, where the water-soluble proteins or polypeptides can assist phospholipids in imparting lipophilicity to beetroot red pigment. This approach further improves the stability of beetroot red pigment in lipid environments.

The higher the proportion of phospholipids, the greater the lipophilic capacity imparted to the beetroot red pigment. However, an excessive amount of phospholipids can result in a softer texture of the beetroot red pigment powder, making it difficult to further break down during ball milling. Based on this, and considering production costs along with the susceptibility of proteins to environmental factors such as denaturation, spoilage, and pathogen growth, the ratio among beetroot red pigment, phospholipids, and protein/polypeptides is critical in this invention.

In addition, regarding the order of ingredient addition, due to the high polarity of phospholipids, if protein is added first, the protein will be the dominant substance in the dispersed phase. At this time, when phospholipids are added, the phospholipid molecules are affected by proteins with larger molecular weights than them, and will preferentially bind to proteins to form irregular combinations, resulting in the isolation of the beetroot red pigment molecules. Under these conditions, the dried and milled beetroot red ultra-fine powder closely resembles regular powder. If water-soluble proteins and/or water-soluble polypeptides are added to the aqueous solution containing the beetroot red pigment and phospholipids, the spatial folding of the protein or polypeptide molecular structure may occur, resulting in protein or polypeptide denaturation, aggregation, and agglomeration, which will affect the lipophilicity and stability of beetroot red.

Second, the present invention directly mixes the oil-soluble ultra-fine beetroot red pigment powder with the vegetable oil. The beetroot red pigment is suspended in the oil in the form of particles. The ultrafine powder is further crushed by repeated grinding of a ball mill-colloid mill. The smaller the particles are, the larger the specific surface area is, which strengthens the lipophilic effect of the phospholipids. This enables the phospholipids to effectively stabilize the dispersion of beetroot red pigment molecules within the oil. After grinding, the beetroot red pigment particles are further refined to a particle size of less than 0.5 μm. With a higher specific surface area and the lipophilicity of phospholipids, the long-term stability of the emulsion can be maintained.

Animal fats have higher calories than vegetable oils and contain a large amount of saturated fatty acids and cholesterol. Excessive consumption can easily lead to hypertension, arteriosclerosis, coronary heart disease, and hyperlipidemia, which is not conducive to human health. In addition, animal fats have a higher freezing point, are easy to solidify at low temperatures, have generally higher viscosity than vegetable oils, and carry a distinctive animal odor, which has a great impact on the aroma and flavor of the final product. Therefore, the present invention selects to mix the ultra-fine beetroot red pigment powder with vegetable oils.

Compared with the prior art, the present invention has the following advantages and effects:

(1) The equipment used in the present invention is standard industry equipment.

(2) The preparation method of the present invention involves no high-temperature operation, does not use organic solvents in the entire process, does not undergo chemical modification, and does not add ingredients such as emulsifiers of synthetic origin. The process and raw materials are environmentally friendly, making it more favorable for food safety.

(3) The oil-soluble beetroot red pigment prepared by the present invention can be stored for a long time without layering or precipitation. In the chocolate application test, the chocolate color is uniform and there are no pigment particles.

(4) The oil-soluble beetroot red pigment composite powder and oil-soluble ultra-fine red pigment powder prepared by the present invention can also be marketed as separate products, offering higher stability than conventional beetroot red pigment.

(5) The oil-soluble beetroot red pigment produced by the present invention can flexibly adjust its dyeing intensity to adapt to different usage environments.

(6) The present invention improves the light and heat stability of beetroot red pigment, expands the application range of beetroot red pigment, and can replace industrial synthetic oil-soluble pigments.

DETAILED DESCRIPTION OF EMBODIMENTS

Figure 1:
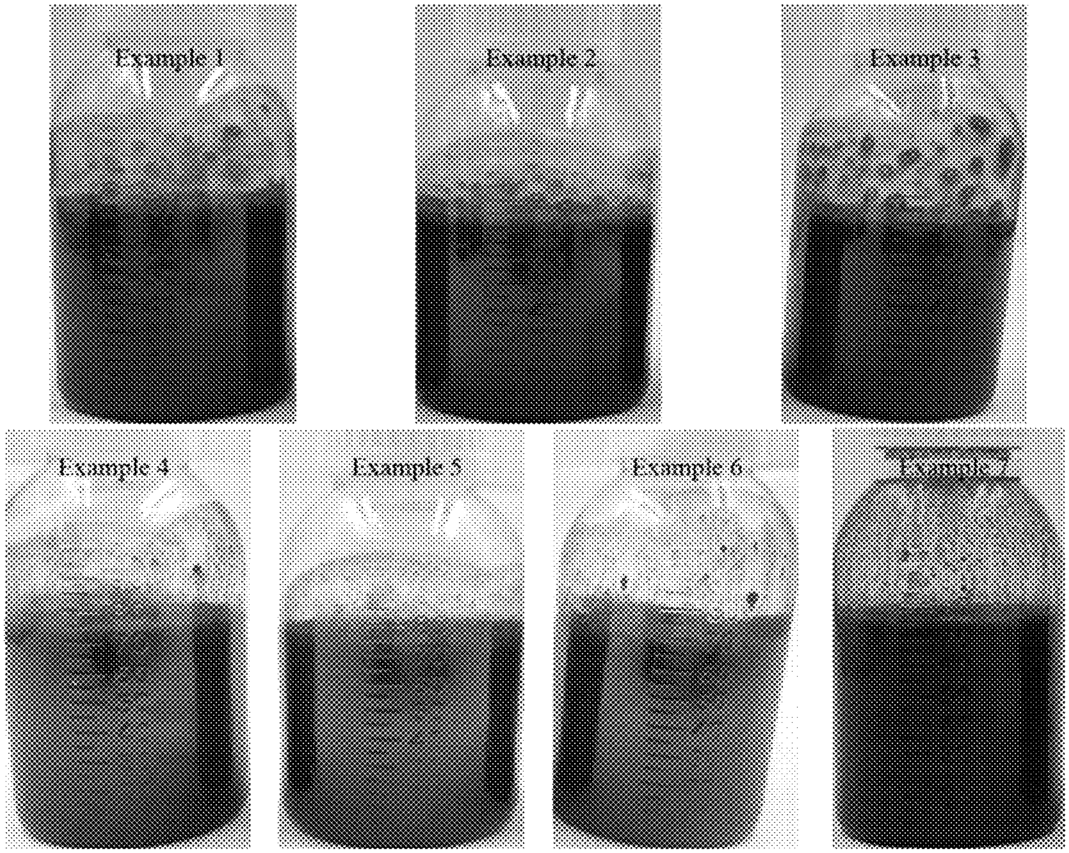
FIG. 1 is a diagram showing the appearance of an emulsion made from the oil-soluble beetroot red pigment obtained in Examples 1 to 7 after 12 months of storage under natural light at 25° C.

The present invention is further described in detail below in conjunction with embodiments and drawings, but the embodiments of the present invention are not limited thereto.

Unless otherwise specified, the experimental methods used are standard techniques, and the materials used (modified soybean phospholipid, enzymatically hydrolyzed soybean phospholipid, sodium caseinate, soy protein isolate, soy oligopeptides, etc.) are commercially available.

(1) Beetroot red pigment described in the embodiment is: using beetroot as raw material, and preparing it through crushing-water extraction-filtration-refining-drying according to a conventional method;

(2) The chocolate application test method described in the embodiment is as follows: 0.1 g of oil-soluble beetroot red pigment is added to 10 g of fully liquefied white chocolate, then stirred evenly and poured into a mold for cooling and shaping. The mold has no restrictions on shape and can be used for easy observation. Under natural light, the optimal result is when the chocolate exhibits a uniform color appearance with no pigment bleeding. Otherwise, it indicates that the beetroot red pigment did not achieve an oil-dispersed state.

(3) The method for detecting color intensity described in the embodiment is as follows: weigh 0.1 g of sample (accurate to 0.0002 g), extract the beetroot red pigment from the oil using 10 ml of acetate-sodium acetate buffer solution (pH 5.4). Repeat the procedure 3-4 times, combine the buffer solutions, and dilute to a final volume of 100 ml. Using the buffer solution as the reference, measure the absorbance of the test solution at 535 nm with a spectrophotometer in a 1 cm cuvette. This absorbance value represents the color intensity.

$$E\frac{1\%}{1\text{ cm}} = \frac{A}{c \times 1}$$

Wherein: A—absorbance at 535 nm; c—concentration of beetroot red solution (4) The deposition rate described in the embodiment refers to the precipitation and accumulation of beetroot red pigment under centrifugal action. The deposition rate reflects the stability of beetroot red in oil. The higher the deposition rate, the more unstable the oil-soluble beetroot red. A deposition rate of less than 10% indicates prolonged stability of the beetroot red pigment in oil, meeting shelf-life requirements. The detection method is: take 5.0 g of oil-soluble beetroot red pigment, centrifuge at 25° C. and 6000 rpm for 10 minutes, pour out the supernatant to obtain xg of the oil layer. The deposition rate (α) is calculated using the following formula:

$$\alpha = (5 - x)/5 \times 100\%$$

Example 1

(1) Add 100 g of beetroot red pigment (color value 150) and 50 g of modified soybean phospholipid to 3500 ml of water, stirring until completely dissolved to obtain an aqueous solution containing beetroot red pigment and phospholipid. Dissolve 350 g of sodium caseinate in 4650 ml of water to obtain a 7% (w/w) sodium caseinate solution.

(2) Slowly add the aqueous solution containing beetroot red pigment and phospholipid prepared in step (1) into the sodium caseinate aqueous solution at a rate of 10 ml/s. Shear the mixture using a high-speed homogenizer at a linear velocity of 20 m/s for 10 minutes to obtain a beetroot red-phospholipid-sodium caseinate mixture.

(3) Homogenize the beetroot red-phospholipid-sodium caseinate mixture obtained in step (2) at 45 Mpa, then pressure spray drying it into a dry powder to obtain a beetroot red pigment composite powder.
(4) The beetroot red pigment composite powder obtained in step (3) is ultra-finely ground at 12,000 rpm in a dry environment at 0 to 10° C. and passed through a 200-mesh sieve to obtain beetroot red pigment ultra-fine powder.
(5) Add 200 g of the beetroot red pigment ultra-fine powder obtained in step (4) to 1800 ml of olive oil and subject to a ball mill-colloid mill grinding cycle for 120 minutes to obtain an oil-soluble beetroot red pigment with a particle size of D90=0.788 μm, a color intensity of 3.0, and a deposition rate of 12.3%. In chocolate applications, the color is uniform with no visible beetroot red pigment particles.

Example 2

(1) Add 100 g of beetroot red pigment (color value 150) and 150 g of modified soybean phospholipid into 2600 ml water, stirring until completely dissolved to obtain an aqueous solution containing beetroot red pigment and phospholipid. Dissolve 500 g of soy protein isolate in 4500 ml of water to obtain a 10% (w/w) soy protein isolate aqueous solution.
(2) Slowly add the aqueous solution containing beetroot red pigment and phospholipid prepared in step (1) into the soy protein isolate aqueous solution at a rate of 10 ml/s. Shear the mixture using a high-speed homogenizer at a linear velocity of 20 m/s for 20 minutes to obtain a beetroot red-phospholipid-soy protein isolate mixture.
(3) Homogenize the beetroot red-phospholipid-soy protein isolate mixture obtained in step (2) at 45 Mpa, then pressure spray drying it into a dry powder to obtain a beetroot red pigment composite powder.
(4) The beetroot red pigment composite powder obtained in step (3) is ultra-finely ground at 12,000 rpm in a dry environment at 0 to 10° C. and passed through a 260-mesh sieve to obtain beetroot red pigment ultra-fine powder.
(5) Add 200 g of the beetroot red pigment ultra-fine powder obtained in step (4) to 1800 ml of olive oil and subject to a ball mill-colloid mill grinding cycle for 120 minutes to obtain an oil-soluble beetroot red pigment with a particle size of D90=0.609 μm, a color intensity of 2.0, and a deposition rate of 8.5%. In chocolate applications, the color is uniform with no visible beetroot red pigment particles.

Example 3

(1) Add 500 g of beetroot red pigment (color value 150) and 250 g of enzymatically hydrolyzed soybean phospholipid into 3500 ml water, stirring until completely dissolved to obtain an aqueous solution containing beetroot red pigment and phospholipid. Dissolve 600 g of sodium caseinate in 3400 ml of water to obtain a 15% (w/w) sodium caseinate aqueous solution.
(2) Slowly add the aqueous solution containing beetroot red pigment and phospholipid prepared in step (1) into the sodium caseinate aqueous solution at a rate of 10 ml/s. Shear the mixture using a high-speed homogenizer at a linear velocity of 20 m/s for 10 minutes to obtain a beetroot red-phospholipid-sodium caseinate mixture.
(3) Homogenize the beetroot red-phospholipid-sodium caseinate mixture obtained in step (2) at 45 Mpa, then pressure spray drying it into a dry powder to obtain a beetroot red pigment composite powder.
(4) The beetroot red pigment composite powder obtained in step (3) is ultra-finely ground at 12,000 rpm in a dry environment at 0 to 10° C. and passed through a 300-mesh sieve to obtain beetroot red pigment ultra-fine powder.
(5) Add 400 g of the beetroot red pigment ultra-fine powder obtained in step (4) to 1600 ml of corn oil and subject to a ball mill-colloid mill grinding cycle for 240 minutes until the beetroot red pigment particle size reaches D90<0.5 μm, resulting in an oil-soluble beetroot red pigment with D90=0.430 μm, a color intensity of 11.1, and a deposition rate of 6.9%. In chocolate applications, the color is uniform with no visible beetroot red pigment particles.

Example 4

(1) Add 500 g of beetroot red pigment (color value 150) and 700 g of enzymatically hydrolyzed soybean phospholipid into 6300 ml water, stirring until completely dissolved to obtain an aqueous solution containing beetroot red pigment and phospholipid. Dissolve 300 g of soy protein isolate in 2700 ml of water to obtain a 10% (w/w) soy protein isolate aqueous solution.
(2) Slowly add the aqueous solution containing beetroot red pigment and phospholipid prepared in step (1) into the soy protein isolate aqueous solution at a rate of 10 ml/s. Shear the mixture using a high-speed homogenizer at a linear velocity of 20 m/s for 10 minutes to obtain a beetroot red-phospholipid-soy protein isolate mixture.
(3) Homogenize the beetroot red-phospholipid-soy protein isolate mixture obtained in step (2) at 45 Mpa, then pressure spray drying it into a dry powder to obtain a beetroot red pigment composite powder.
(4) The beetroot red pigment composite powder obtained in step (3) is ultra-finely ground at 12,000 rpm in a dry environment at 0 to 10° C. and passed through a 260-mesh sieve to obtain beetroot red pigment ultra-fine powder.
(5) Add 400 g of the beetroot red pigment ultra-fine powder obtained in step (4) to 1600 ml of corn oil and subject to a ball mill-colloid mill grinding cycle for 240 minutes until the beetroot red pigment particle size reaches D90<0.5 μm, resulting in an oil-soluble beetroot red pigment with D90=0.481 μm, a color intensity of 10.0, and a deposition rate of 4.7%. In chocolate applications, the color is uniform with no visible beetroot red pigment particles.

Example 5

(1) Add 800 g of beetroot red pigment (color value 150), 370 g of modified soybean phospholipid, and 220 g of enzymatically hydrolyzed soybean phospholipid into 6600 ml water, stirring until completely dissolved to obtain an aqueous solution containing beetroot red pigment and phospholipid. Dissolve 500 g of soy protein isolate in 2000 ml of water to obtain a 20% (w/w) soy protein isolate aqueous solution.

(2) Slowly add the aqueous solution containing beetroot red pigment and phospholipid prepared in step (1) into the soy protein isolate aqueous solution at a rate of 10 ml/s. Shear the mixture using a high-speed homogenizer at a linear velocity of 20 m/s for 20 minutes to obtain a beetroot red-phospholipid-soy protein isolate mixture.
(3) Homogenize the beetroot red-phospholipid-soy protein isolate mixture obtained in step (2) at 45 Mpa, then pressure spray drying it into a dry powder to obtain a beetroot red pigment composite powder.
(4) The beetroot red pigment composite powder obtained in step (3) is ultra-finely ground at 12,000 rpm in a dry environment at 0 to 10° C. and passed through a 220-mesh sieve to obtain beetroot red pigment ultra-fine powder.
(5) Add 600 g of the beetroot red pigment ultra-fine powder obtained in step (4) to 1400 ml of sunflower oil and subject to a ball mill-colloid mill grinding cycle for 320 minutes until the beetroot red pigment particle size reaches D90<0.5 μm, resulting in an oil-soluble beetroot red pigment with D90=0.218 μm, a color intensity of 19.0, and a deposition rate of 1.87%. In chocolate applications, the color is uniform with no visible beetroot red pigment particles.

Example 6

(1) Add 800 g of beetroot red pigment (color value 80), 300 g of modified soybean phospholipid, and 520 g of enzymatically hydrolyzed soybean phospholipid into 7600 ml water, stirring until completely dissolved to obtain an aqueous solution containing beetroot red pigment and phospholipid. Dissolve 600 g of soy protein isolate and 150 g of sodium caseinate in 3000 ml of water to obtain a 20% (w/w) mixed protein aqueous solution.
(2) Slowly add the aqueous solution containing beetroot red pigment and phospholipid prepared in step (1) into the mixed protein aqueous solution at a rate of 10 ml/s. Shear the mixture using a high-speed homogenizer at a linear velocity of 20 m/s for 20 minutes to obtain a beetroot red-phospholipid-mixed protein mixture.
(3) Homogenize the beetroot red-phospholipid-mixed protein mixture obtained in step (2) at 45 Mpa, then pressure spray drying it into a dry powder to obtain a beetroot red pigment composite powder.
(4) The beetroot red pigment composite powder obtained in step (3) is ultra-finely ground at 12,000 rpm in a dry environment at 0 to 10° C. and passed through a 300-mesh sieve to obtain beetroot red pigment ultra-fine powder.
(5) Add 600 g of the beetroot red pigment ultra-fine powder obtained in step (4) to 1400 ml of sunflower oil and subject to a ball mill-colloid mill grinding cycle for 320 minutes until the beetroot red pigment particle size reaches D90<0.5 μm, resulting in an oil-soluble beetroot red pigment with D90=0.198 μm, a color intensity of 8.1, and a deposition rate of 0.94%. In chocolate applications, the color is uniform with no visible beetroot red pigment particles.

Example 7

(1) Add 500 g of beetroot red pigment (color value 80), 150 g of modified soybean phospholipid, and 350 g of enzymatically hydrolyzed soybean phospholipid into 8000 ml water, stirring until completely dissolved to obtain an aqueous solution containing beetroot red pigment and phospholipid. Dissolve 300 g of soy oligopeptides and 150 g of sodium caseinate in 2197 ml of water to obtain a 17% (w/w) mixed protein aqueous solution.
(2) Slowly add the aqueous solution containing beetroot red pigment and phospholipid prepared in step (1) into the mixed protein aqueous solution at a rate of 10 ml/s. Shear the mixture using a high-speed homogenizer at a linear velocity of 20 m/s for 20 minutes to obtain a beetroot red-phospholipid-mixed protein mixture.
(3) Homogenize the beetroot red-phospholipid-mixed protein mixture obtained in step (2) at 45 Mpa, then pressure spray drying it into a dry powder to obtain a beetroot red pigment composite powder.
(4) The beetroot red pigment composite powder obtained in step (3) is ultra-finely ground at 12,000 rpm in a dry environment at 0 to 10° C. and passed through a 240-mesh sieve to obtain beetroot red pigment ultra-fine powder.
(5) Add 450 g of the beetroot red pigment ultra-fine powder obtained in step (4) to 1550 ml of sunflower oil and subject to a ball mill-colloid mill grinding cycle for 300 minutes until the beetroot red pigment particle size reaches D90<0.5 μm, resulting in an oil-soluble beetroot red pigment with D90=0.375 μm, a color intensity of 6.1, and a deposition rate of 2.94%. In chocolate applications, the color is uniform with no visible beetroot red pigment particles.

Comparative Example 1

This embodiment serves as a comparative example, intended to evaluate the effects of directly mixing ordinary beet red powder (containing dextrin) with emulsifiers and oils on the quality of the resulting oil-soluble beetroot red pigment. The specific method is as follows:

Replace the ultra-fine powder of beetroot red pigment in step (5) of Example 1 with ordinary beetroot red powder (containing dextrin) of equivalent color value and quality, and add it together with the emulsifiers from Table 1 into olive oil, maintaining the same emulsifier ratio as the phospholipids in Example 1. Each group of experiments is conducted under the same conditions as in step (5) of Example 1 to prepare the oil-soluble beetroot red pigment. The resulting oil-soluble beetroot red pigment is analyzed for chocolate appearance and emulsion stability after being stored for 12 months.

TABLE 1

Types of emulsifiers, proportions, and final product appearances of each control sample in Comparative Example 1

| Control Sample Number | Emulsifier Name | Emulsifier Proportion (%) | Deposition Rate(%) | Chocolate Appearance | After 12 Months of Storage |
|---|---|---|---|---|---|
| 1 | Polyglycerol Esters (HLB 2.5-4.5) | 1.0 | 79.4 | Uneven | Precipitation |
| 2 | Sucrose Fatty Acid Esters (HLB 2.0-3.0) | 1.0 | 91.2 | Uneven | Precipitation |
| 3 | Citric Acid Fatty Acid Glycerides | 1.0 | 77.0 | Uneven | Precipitation |

TABLE 1-continued

Types of emulsifiers, proportions, and final product appearances of each control sample in Comparative Example 1

| Control Sample Number | Emulsifier Name | Emulsifier Proportion (%) | Deposition Rate(%) | Chocolate Appearance | After 12 Months of Storage |
|---|---|---|---|---|---|
| 4 | Polyglycerol Ricinoleate | 1.0 | 79.9 | Uneven | Precipitation |
| 5 | Enzymatically Hydrolyzed Soybean Phospholipids | 1.0 | 85.3 | Uneven | Precipitation |
| 6 | Modified Soybean Phospholipids | 1.0 | 81.7 | Uneven | Precipitation |
| 7 | Diacetyl Tartaric Acid Mono- and Diglycerides | 1.0 | 70.4 | Uneven | Precipitation |
| 8 | Mono- and Diglycerides of Fatty Acids (HLB 3.0) | 1.0 | 93.2 | Uneven | Precipitation |

Comparative Example 2

This embodiment serves as a comparative example, intended to evaluate the effects of directly mixing ordinary beet red powder (containing dextrin) with emulsifiers and oils on the quality of the resulting oil-soluble beetroot red pigment. The specific method is as follows:

Replace the ultra-fine powder of beetroot red pigment in step (5) of Example 4 with ordinary beetroot red powder (containing dextrin) of equivalent color value and quality, and add it together with the emulsifiers from Table 2 into olive oil, maintaining the same emulsifier ratio as the phospholipids in Example 4. Each group of experiments is conducted under the same conditions as in step (5) of Example 4 to prepare the oil-soluble beetroot red pigment. The resulting oil-soluble beetroot red pigment is analyzed for chocolate appearance and emulsion appearance after being stored for 12 months.

TABLE 2

Types of emulsifiers, proportions, and final product appearances of each control sample in Comparative Example 2

| Control Sample Number | Emulsifier Name | Emulsifier Proportion (%) | Deposition Rate(%) | Chocolate Appearance | After 12 Months of Storage |
|---|---|---|---|---|---|
| 9 | Polyglycerol Esters (HLB 2.5-4.5) | 9.3 | 65.6 | Uneven | Precipitation |
| 10 | Sucrose Fatty Acid Esters (HLB 2.0-3.0) | 9.3 | 77.9 | Uneven | Precipitation |
| 11 | Citric Acid Fatty Acid Glycerides | 9.3 | 69.1 | Uneven | Precipitation |
| 12 | Polyglycerol Ricinoleate | 9.3 | 42.6 | Uneven | Precipitation |
| 13 | Enzymatically Hydrolyzed Soybean Phospholipids | 9.3 | 73.4 | Uneven | Precipitation |
| 14 | Modified Soybean Phospholipids | 9.3 | 77.0 | Uneven | Precipitation |

TABLE 2-continued

Types of emulsifiers, proportions, and final product appearances of each control sample in Comparative Example 2

| Control Sample Number | Emulsifier Name | Emulsifier Proportion (%) | Deposition Rate(%) | Chocolate Appearance | After 12 Months of Storage |
|---|---|---|---|---|---|
| 15 | Diacetyl Tartaric Acid Mono-and Diglycerides | 9.3 | 23.7 | Uneven | Precipitation |
| 16 | Mono-and Diglycerides of Fatty Acids (HLB 3.0) | 9.3 | 81.2 | Uneven | Precipitation |

Comparative Example 3

This embodiment serves as a comparative example, intended to evaluate the effects of directly mixing ordinary beet red powder (containing dextrin) with emulsifiers and oils on the quality of the resulting oil-soluble beetroot red pigment. The specific method is as follows:

Replace the ultra-fine powder of beetroot red pigment in step (5) of Example 6 with ordinary beetroot red powder (containing dextrin) of equivalent color value and quality, and add it together with the emulsifiers from Table 3 into olive oil, maintaining the same emulsifier ratio as the phospholipids in Example 6. Each group of experiments is conducted under the same conditions as in step (5) of Example 6 to prepare the oil-soluble beetroot red pigment. The resulting oil-soluble beetroot red pigment is analyzed for chocolate appearance and emulsion appearance after being stored for 12 months.

TABLE 3

Types of emulsifiers, proportions, and final product appearances of each control sample in Comparative Example 3

| Control Sample Number | Emulsifier Name | Emulsifier Proportion (%) | Deposition Rate(%) | Chocolate Appearance | After 12 Months of Storage |
|---|---|---|---|---|---|
| 17 | Polyglycerol Esters (HLB 2.5-4.5) | 11.0 | 59.7 | Uneven | Precipitation |
| 18 | Sucrose Fatty Acid Esters (HLB 2.0-3.0) | 11.0 | 92.9 | Uneven | Precipitation |
| 19 | Citric Acid Fatty Acid Glycerides | 11.0 | 75.5 | Uneven | Precipitation |
| 20 | Polyglycerol Ricinoleate | 11.0 | 37.7 | Uneven | Precipitation |
| 21 | Enzymatically Hydrolyzed Soybean Phospholipids | 11.0 | 65.2 | Uneven | Precipitation |
| 22 | Modified Soybean Phospholipids | 11.0 | 49.6 | Uneven | Precipitation |
| 23 | Diacetyl Tartaric Acid Mono-and Diglycerides | 11.0 | 12.4 | Uneven | Precipitation |
| 24 | Mono-and Diglycerides of Fatty Acids (HLB 3.0) | 11.0 | 80.1 | Uneven | Precipitation |

Comparative Example 4

Comparative Example 4: Excessive Phospholipid Ratio (1) Add 50 g of beetroot red pigment (color value of 150) and 1800 g of enzymatically hydrolyzed soybean phospholipid to 13.950 L of water, and stir until fully dissolved to obtain an aqueous solution containing beetroot red pigment and phospholipids. Dissolve 350 g of sodium caseinate in 4650 ml of water to prepare a 7% (w/w) sodium caseinate solution.
(2) Slowly add the aqueous solution containing beetroot red pigment and phospholipids prepared in step (1) to the mixed protein solution at a rate of 10 ml/s. Then, use a high-speed shear mixer to shear at a linear speed of 20 m/s for 10 minutes to obtain a beetroot red-phospholipid-protein mixture.
(3) Homogenize the beetroot red-phospholipid-protein mixture prepared in step (2) at 45 MPa, then perform pressure spray drying to obtain a dry powder, resulting in a beetroot red pigment composite powder. Due to the high phospholipid ratio, this composite powder exhibits high viscosity and poor flowability, causing severe adhesion during drying, with a thick layer of beetroot red powder adhering to the inner walls of the equipment.
(4) Subject the beetroot red pigment composite powder prepared in step (3) to ultra-fine grinding at 12,000 rpm in a drying environment of 0-10° C. Due to the high viscosity of the powder, it adheres to the pin bars of the grinder, making sieving difficult. Lowering the temperature to −10° C. to 0° C. does not improve the grinding effect.
(5) Add 200 g of the ultra-fine beetroot red pigment powder prepared in step (4) to 1800 ml of olive oil, and process it using a ball mill-grinding and colloid mill-crushing cycle for 120 minutes to obtain oil-soluble beetroot red pigment with a particle size of D90=15.388 μm. Due to the presence of numerous insoluble particles during testing, its coloring strength could not be measured. In chocolate applications, the pigment could not mix with chocolate for coloring purposes. During the cycle process, the ball mill and colloid mill experienced multiple blockages, with irregular paste-like lumps being cleared as blockage material. Analysis indicated that the cause was the high viscosity of the beetroot red powder, leading to adhesion and aggregation under mechanical forces.

Comparative Example 5

(1) Add 800 g of beetroot red pigment (color value 150), 370 g of modified soybean phospholipid, and 220 g of enzymatically hydrolyzed soybean phospholipid to 6600 ml of water, and stir until completely dissolved to obtain an aqueous solution containing beetroot red pigment and phospholipids. Dissolve 500 g of soy protein isolate in 2000 ml of water to obtain a 20% (w/w) soy protein isolate solution.
(2) Slowly add the soy protein isolate solution prepared in step (1) to the aqueous solution containing beetroot red pigment and phospholipids at a rate of 10 ml/s. As the protein solution is added, solid particles gradually appear on the surface and increase in quantity. Use a high-speed shear mixer to shear at a linear speed of 20 m/s for 20 minutes, then filter through a 100-mesh screen to obtain a beetroot red-phospholipid-protein mixture. A large amount of pigment-containing insoluble material is observed on the filter screen, indicating that the protein likely denatured upon encountering the highly polar beetroot red-phospholipid solution.
(3) Homogenize the beetroot red-phospholipid-protein mixture obtained by filtration in step (2) at 45 MPa, then perform pressure spray drying to obtain a dry powder, resulting in beetroot red pigment composite powder.
(4) Grind the beetroot red pigment composite powder obtained in step (3) at an elevated temperature of 12,000 rpm in a drying environment of 0-10° C., and pass it through a 220-mesh screen to obtain ultra-fine beetroot red pigment powder.
(5) Add 600 g of the ultra-fine beetroot red pigment powder prepared in step (4) to 1400 ml of sunflower oil, and process it using a ball mill-colloid mill cycle for 320 minutes to obtain oil-soluble beetroot red pigment with a particle size of D90=1.884 μm, a coloring strength of 9.2, and a deposition rate of 23.94%. In chocolate applications, the color is uneven, and beetroot red pigment particles are present.

The results of Comparative Examples 1-3 indicate that increasing the amount of emulsifier can enhance the stability of oil-soluble beetroot red pigment, but the improvement is very limited. The primary reason is that beetroot red pigment molecules lack lipophilicity. Although emulsifiers contain hydrophilic groups, there is no water in the oil-soluble environment. The hydrophilic groups of the emulsifier and beetroot red molecules are maintained only by intermolecular forces, which are far from sufficient to overcome the gravitational forces of the beetroot red molecules themselves. This results in easy aggregation and deposition during the shelf life, adversely affecting the product's usability.

Figure 2:
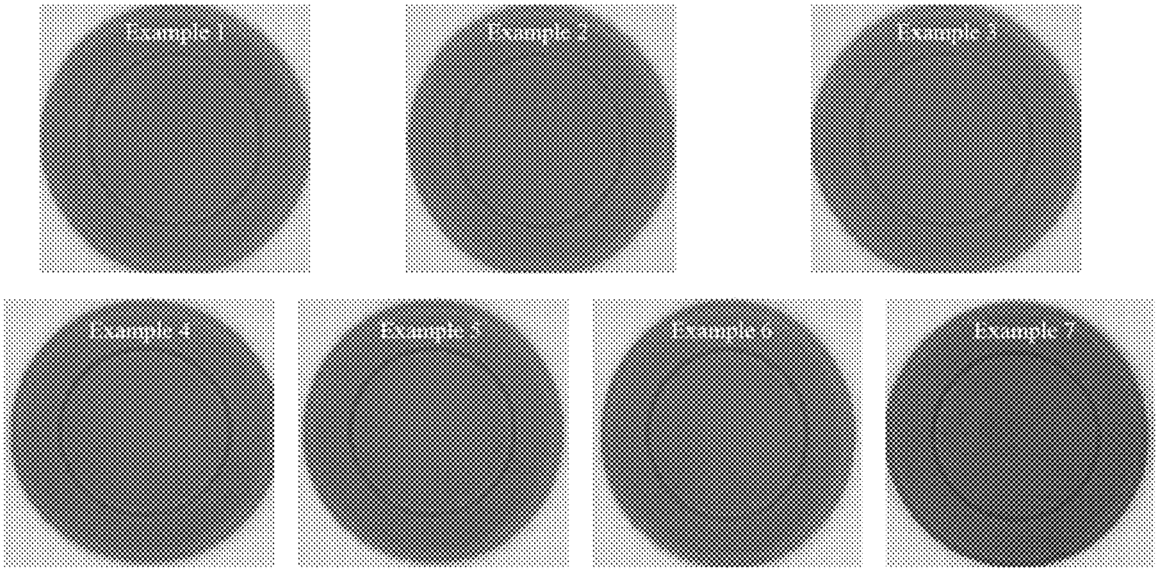
FIG. 2 is a diagram showing the appearance of chocolate made from the oil-soluble beetroot red pigments obtained in Examples 1 to 7.
Figure 3:
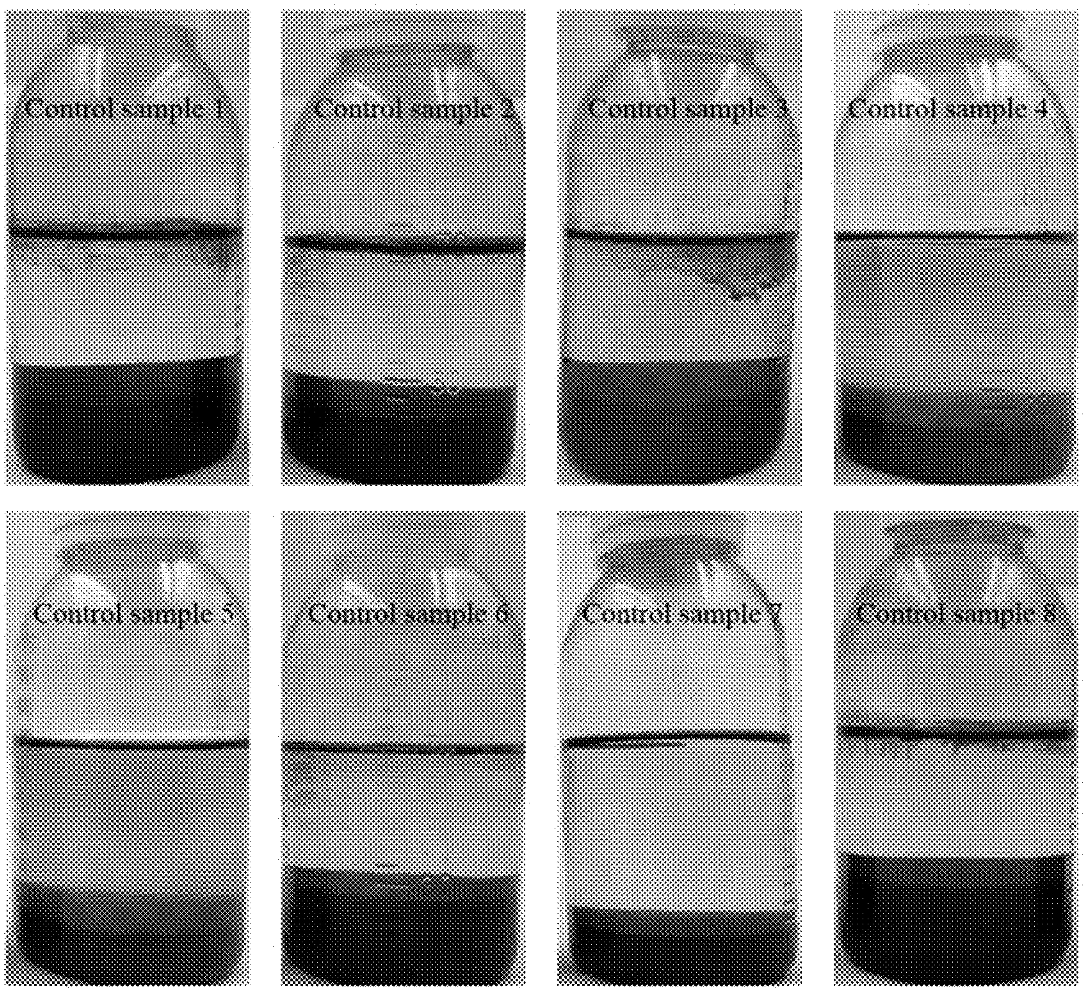
FIG. 3 is a diagram showing the appearance of the emulsions made from the oil-soluble beet red pigments numbered as control samples 1 to 8 in Comparative Example 1 after 12 months of storage under natural light at 25° C.
Figure 4:
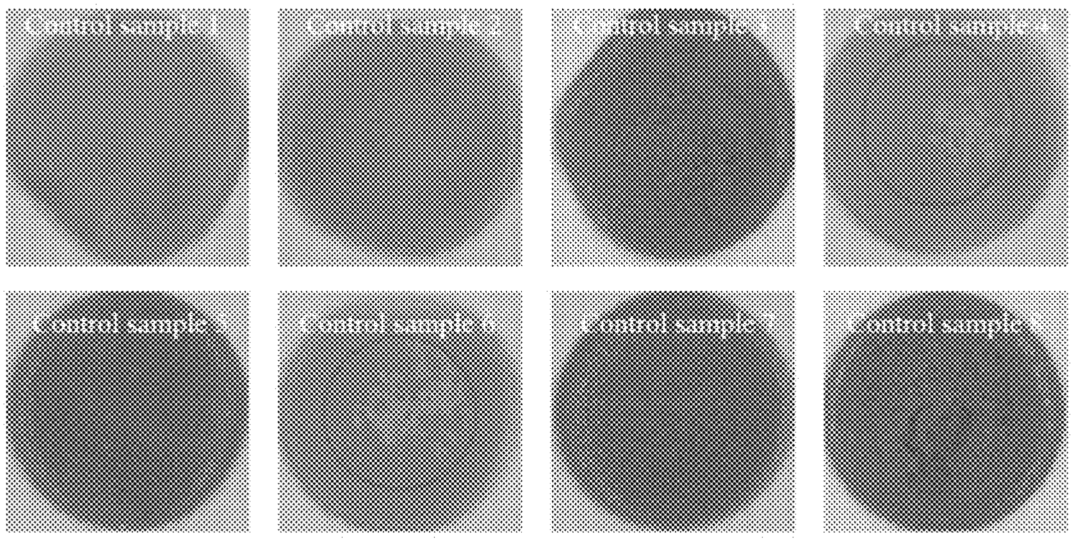
FIG. 4 is a diagram showing the appearance of chocolates made from oil-soluble betaine pigments numbered as control samples 1 to 8 in Comparative Example 1.
Figure 5:
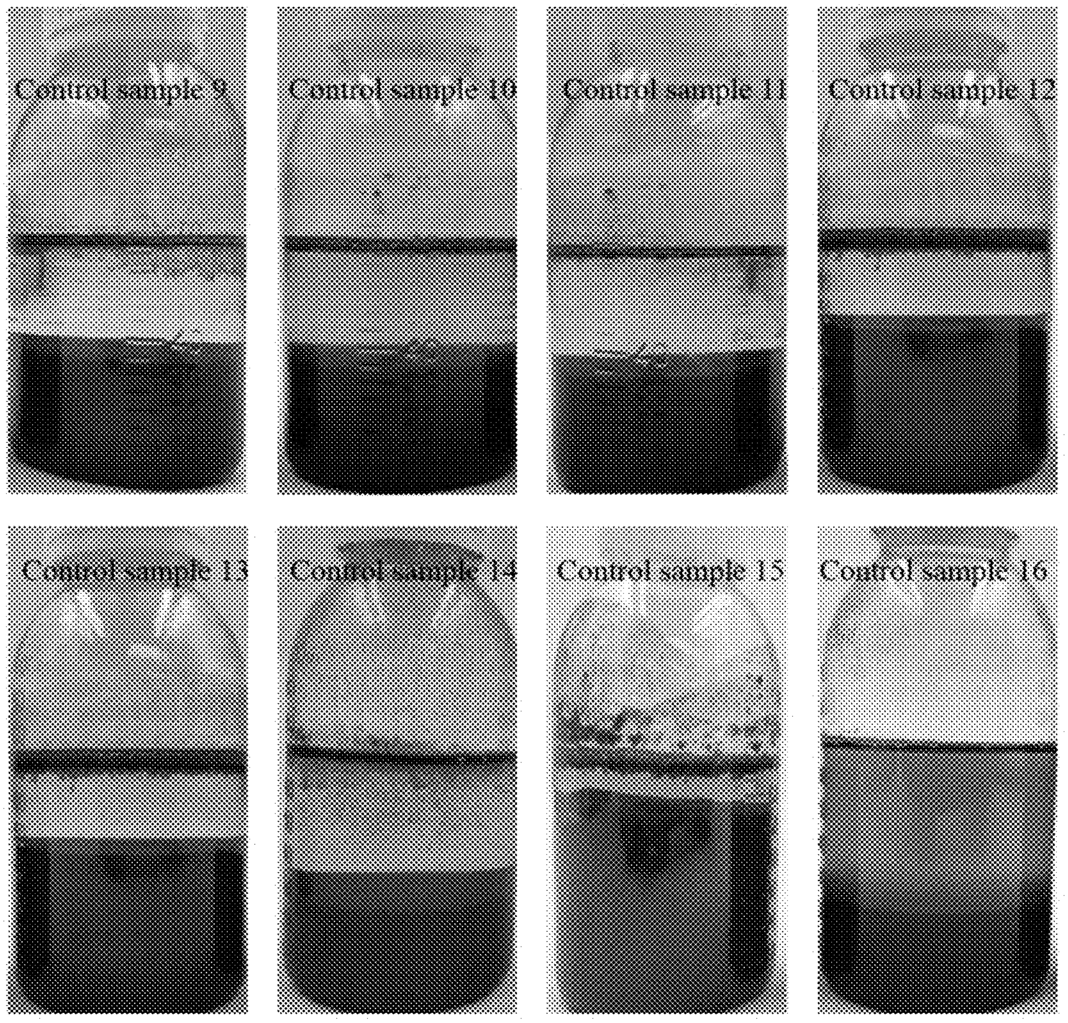
FIG. 5 is a diagram showing the appearance of the emulsion made from the oil-soluble beetroot red pigment numbered as control samples 9 to 16 in Comparative Example 2 after 12 months of storage under natural light at 25° C.
Figure 6:
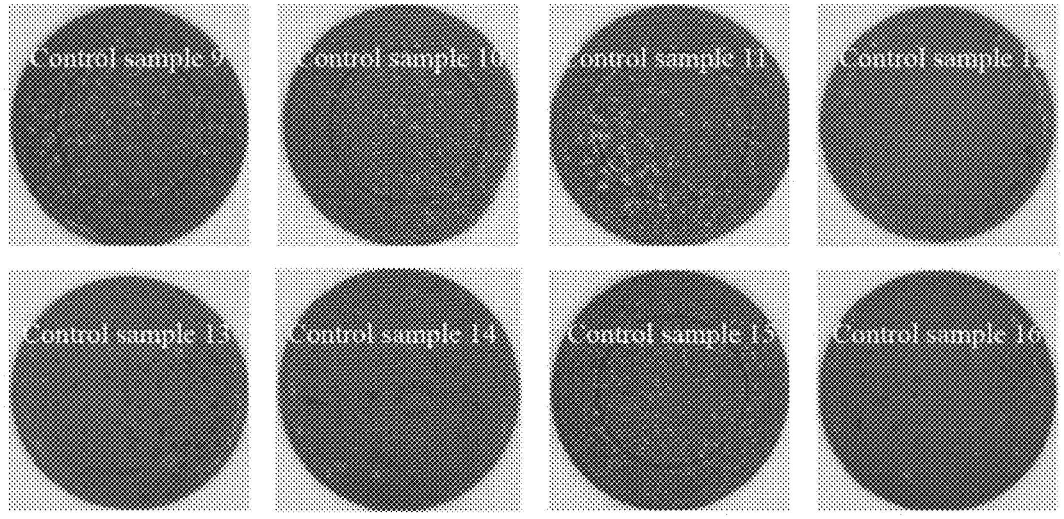
FIG. 6 is a diagram showing the appearance of chocolate made from the oil-soluble beetroot red pigments numbered as control samples 9 to 16 in Comparative Example 2.
Figure 7:
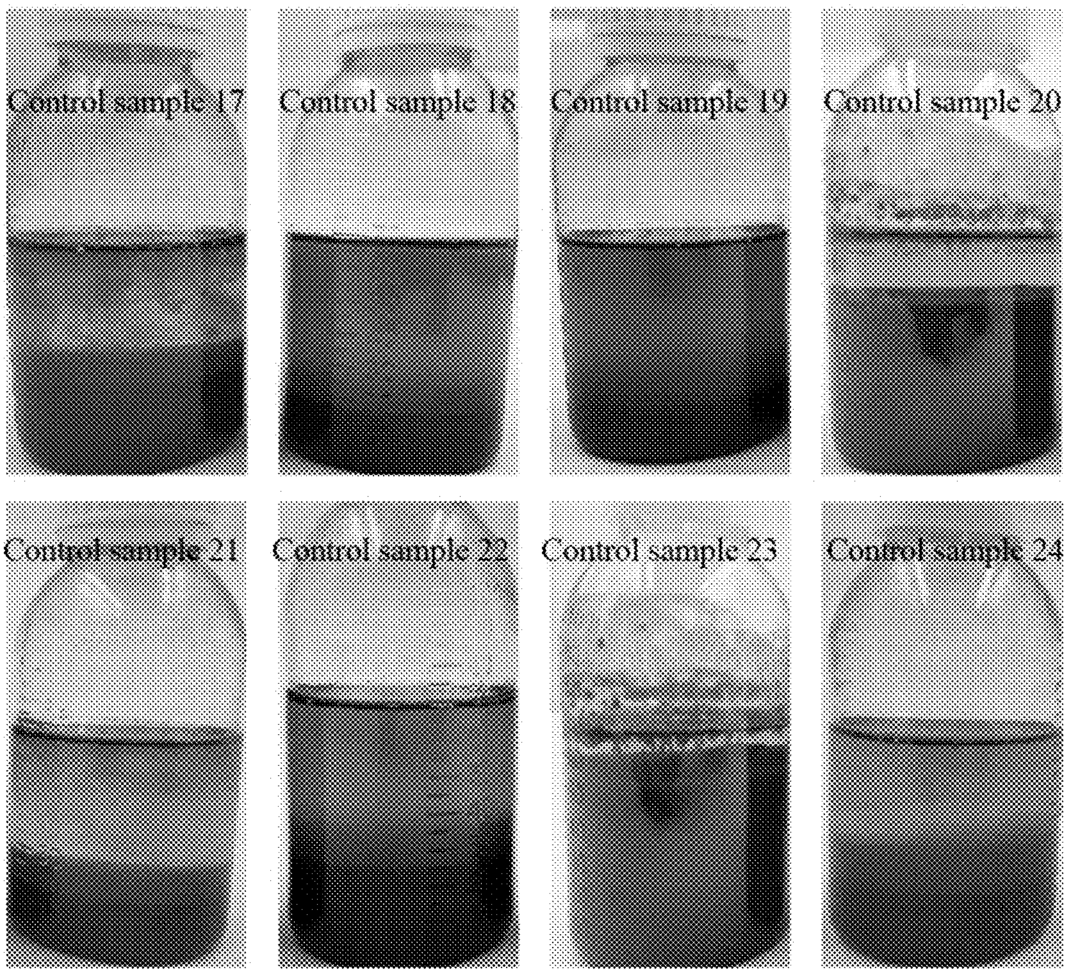
FIG. 7 is a diagram showing the appearance of the emulsion made from oil-soluble beetroot red pigments numbered as control samples 17 to 24 in Comparative Example 3 after 12 months of storage under natural light at 25° C.
Figure 8:
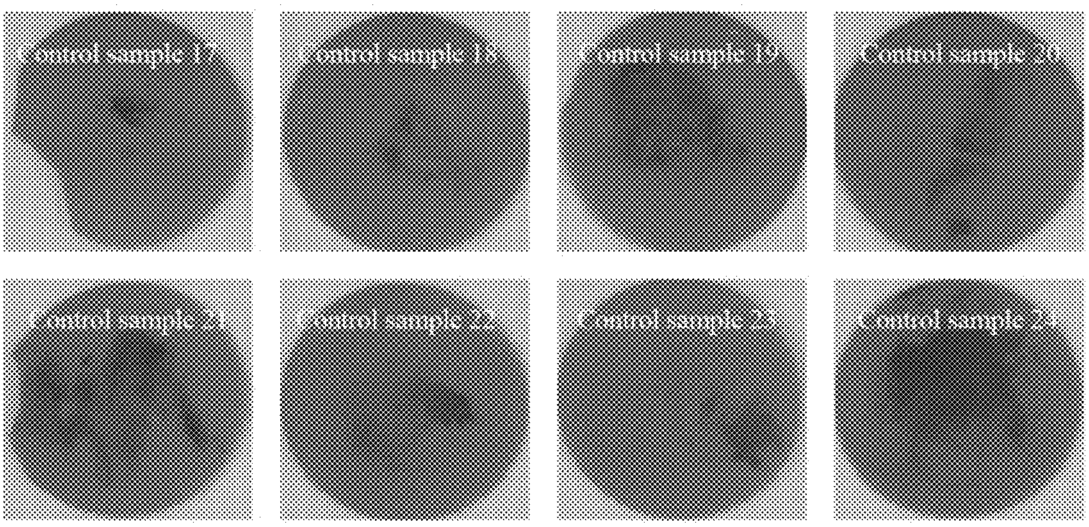
FIG. 8 is a diagram showing the appearance of chocolate made from the oil-soluble beetroot red pigments numbered as control samples 17 to 24 in Comparative Example 3.
Figure 9:
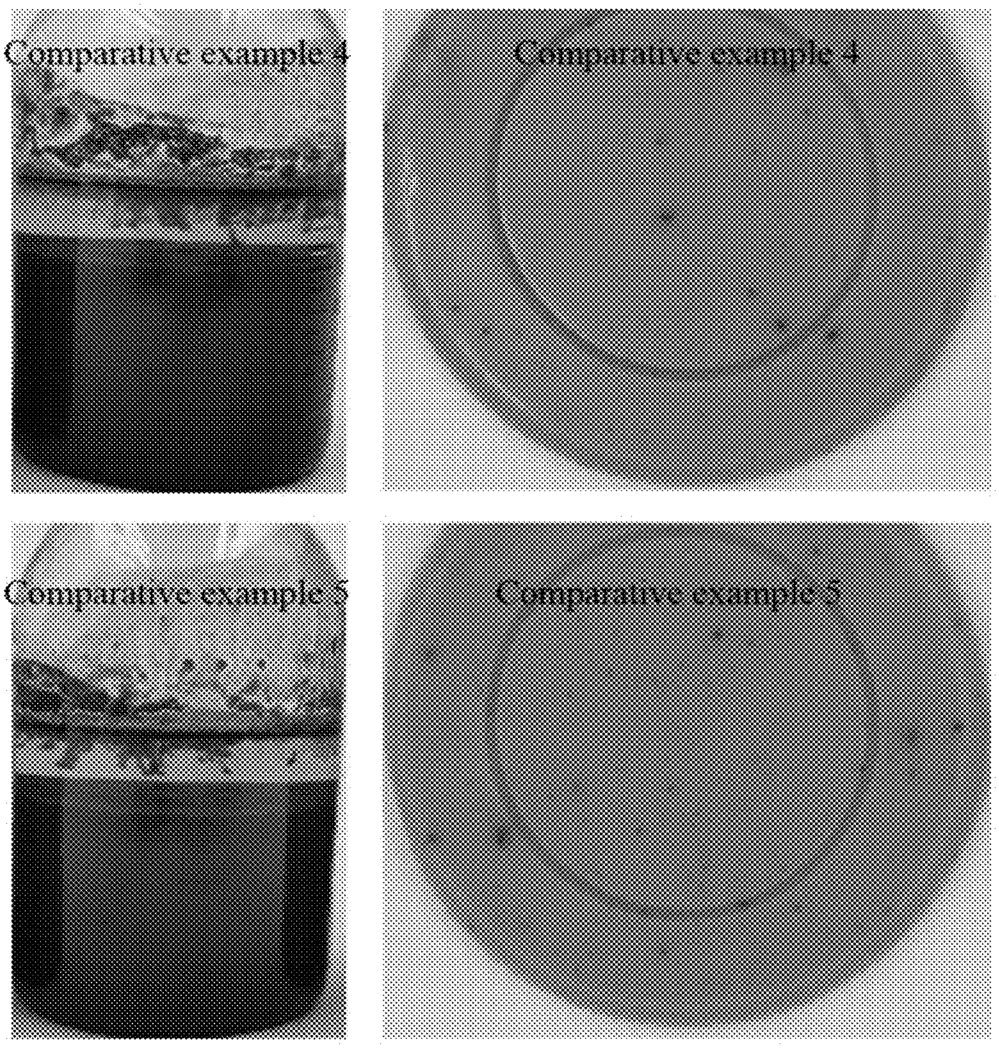
FIG. 9 is a diagram showing the appearance of the emulsion and chocolate made from the oil-soluble beetroot red pigments in Comparative Examples 4 and 5 after 12 months of storage under natural light at 25° C.

As shown in FIGS. 3-8, the stability of the oil-soluble beetroot red pigment emulsion in Comparative Examples 1-3 is positively correlated with the amount of emulsifier used. However, beetroot red pigment itself lacks the ability to bind with the emulsifier and can only rely on the viscosity of the emulsifier to maintain a limited suspended dispersion. Compared to the preparation method provided by this invention, the stability differs significantly. In the 12-month storage test of Examples 1-7, no changes were observed in the emulsion state, and the appearance in chocolate applications remained normal (FIGS. 1-2). In Comparative Example 1, all pigments in Control Samples 1-8 precipitated after 12 months of storage, resulting in a light and uneven color appearance in chocolate applications (FIGS. 3-4). In Comparative Example 2, all pigments in Control Samples 9-16 precipitated after 12 months, with a reduced extent of deposition, though the color in chocolate applications remained uneven (FIGS. 5-6). In Comparative Example 3, all pigments in Control Samples 17-24 precipitated after 12 months, with further reduced deposition, but the color in chocolate applications was still uneven (FIGS. 7-8). Among these, Control Sample 23 exhibited less deposition, but the diacetyl tartaric acid mono- and diglycerides imparted a strong acetic acid odor, significantly affecting the flavor.

Additionally, it can be observed from Examples 1-7 that a longer processing time in the ball mill grinding-colloid mill crushing cycle results in a smaller particle size of the oil-soluble beetroot red pigment, a lower deposition rate, and increased stability.

The above examples represent preferred embodiments of the present invention; however, the implementation of the invention is not limited to these examples. Any modifications, alterations, substitutions, combinations, or simplifications that do not deviate from the spirit and principles of the present invention are considered equivalent substitutions and are included within the protection scope of this invention.

The invention claimed is:

1. A method for preparing an oil-soluble beetroot red pigment, comprising the following steps:

(1) adding an aqueous solution containing a beetroot red pigment and a phospholipid to an aqueous solution containing a water-soluble protein and/or water-soluble peptide to obtain a beetroot red pigment-phospholipid-protein/peptide mixture;

(2) drying the beetroot red pigment-phospholipid-protein/peptide mixture obtained in step (1) to obtain an oil-soluble beetroot red pigment composite powder;

(3) subjecting the oil-soluble beetroot red pigment composite powder obtained in step (2) to low-temperature ultra-fine grinding to obtain an oil-soluble beetroot red pigment ultra-fine powder; and (4) adding the oil-soluble beetroot red pigment ultra-fine powder obtained in step (3) to vegetable oil, and grind to disperse, thereby obtaining the oil-soluble beetroot red pigment.

2. The method for preparing the oil-soluble beetroot red pigment according to claim 1, wherein in step (1), a mass ratio of the beetroot red pigment to the phospholipid is 1:(0.05-30.0), a mass fraction of the aqueous solution containing the water-soluble protein and/or water-soluble peptide is 5-45%, and a mass ratio of the water-soluble proteins and water-soluble peptides to the beetroot red is (0.01-13.0):1 in the beetroot red pigment-phospholipid-protein/peptide mixture.

3. The method for preparing the oil-soluble beetroot red pigment according to claim 1, wherein in step (1), the phospholipid is lecithin, modified soybean phospholipid, or enzymatically hydrolyzed soybean phospholipid; the water-soluble protein is a collagen, a soy protein isolate, or a sodium caseinate; and the peptide is a soybean oligopeptide.

4. The method for preparing the oil-soluble beetroot red pigment according to claim 1, wherein in step (3), the low temperature is set at 0-10° C.

5. The method for preparing the oil-soluble beetroot red pigment according to claim 1, wherein in step (3), a particle size of the oil-soluble beetroot red ultra-fine powder ranges from 100 to 300 mesh.

6. The method for preparing the oil-soluble beetroot red pigment according to claim 1, wherein in step (4), a mass fraction of the beetroot red ultra-fine powder in the vegetable oil ranges from 10% to 50%.

7. The method for preparing the oil-soluble beetroot red pigment according to claim 1, wherein in step (4), the grinding and dispersion is performed using a ball mill-colloid mill cycle treatment.

8. The method for preparing the oil-soluble beetroot red pigment according to claim 1, wherein in step (4), a grinding and dispersion treatment is conducted until a D90 of the beetroot red pigment is less than 0.5 μm.

* * * * *